(12) United States Patent
Crombie

(10) Patent No.: US 12,484,901 B2
(45) Date of Patent: Dec. 2, 2025

(54) CLOSURE DEVICE

(71) Applicant: ZSX Medical, LLC, Moorestown, NJ (US)

(72) Inventor: John Crombie, East Hanover, NJ (US)

(73) Assignee: ZSX MEDICAL, LLC, Moorestown, NJ (US)

( * ) Notice: Subject to any disclaimer, the term of this patent is extended or adjusted under 35 U.S.C. 154(b) by 358 days.

(21) Appl. No.: 18/113,804

(22) Filed: Feb. 24, 2023

(65) Prior Publication Data

US 2023/0270439 A1    Aug. 31, 2023

Related U.S. Application Data

(60) Provisional application No. 63/314,419, filed on Feb. 27, 2022.

(51) Int. Cl.
*A61B 17/08* (2006.01)

(52) U.S. Cl.
CPC .................... *A61B 17/08* (2013.01)

(58) Field of Classification Search
CPC ..... A61B 17/08; A61B 17/083; A61B 17/122; A61B 17/0487; A61B 17/0057; A61B 17/11; A61B 17/12045; A61B 17/683; A61B 17/688; A61B 2017/081; A61B 2017/088; A61B 2017/1103; A61B 2017/00575; A61B 2017/00579; A61B 2017/00606; A61B 2017/0419; A61B 2017/00637; A61B 2017/00641; A61F 2/246
See application file for complete search history.

(56) References Cited

U.S. PATENT DOCUMENTS

| | | |
|---|---|---|
| 3,867,944 A | 2/1975 | Samuels |
| D277,785 S | 2/1985 | Green |
| D283,642 S | 4/1986 | Gravener et al. |
| D286,442 S | 10/1986 | Korthoff et al. |
| 4,932,955 A | 6/1990 | Merz et al. |
| 5,366,458 A | 11/1994 | Korthoff et al. |
| 5,423,857 A | 6/1995 | Rosenman et al. |
| 5,713,911 A | 2/1998 | Racenet et al. |
| 5,713,912 A | 2/1998 | Porter |

(Continued)

FOREIGN PATENT DOCUMENTS

| | | |
|---|---|---|
| EP | 0714633 A1 | 6/1996 |
| WO | 2010126751 A1 | 11/2010 |
| WO | 2013165698 A1 | 11/2013 |

*Primary Examiner* — Diane D Yabut
(74) *Attorney, Agent, or Firm* — Panitch Schwarze Belisario & Nadel LLP

(57) ABSTRACT

A closure device includes a first jaw and a second jaw. The first jaw has a first plate extending along an axial axis and at least one pair of first teeth projecting from the first plate. The second jaw has a second plate extending generally parallel to the first plate and at least one pair of second teeth projecting from the second plate. A thru-hole extends substantially perpendicularly, entirely through the second plate and a post is secured to and projects from the first plate along a longitudinal axis oriented substantially perpendicularly to the first and second plates. The post extends through the thru-hole in a rotationally fixed manner, whereby the at least one pair of first teeth face the at least one pair of second teeth.

20 Claims, 7 Drawing Sheets

(56) References Cited

U.S. PATENT DOCUMENTS

| | | | |
|---|---|---|---|
| 5,800,436 A * | 9/1998 | Lerch | A61B 17/688 |
| | | | 606/331 |
| 6,165,204 A | 12/2000 | Levinson et al. | |
| 6,210,419 B1 | 4/2001 | Mayenberger et al. | |
| 6,261,303 B1 | 7/2001 | Mayenberger et al. | |
| 7,112,214 B2 | 9/2006 | Peterson et al. | |
| 7,699,860 B2 | 4/2010 | Huitema et al. | |
| 8,066,736 B2 | 11/2011 | Peterson et al. | |
| 8,075,481 B2 | 12/2011 | Park et al. | |
| 8,366,726 B2 | 2/2013 | Dennis | |
| 2002/0111641 A1 | 8/2002 | Peterson et al. | |
| 2004/0193185 A1 | 9/2004 | McBrayer | |
| 2005/0216036 A1 | 9/2005 | Nakao | |
| 2007/0213747 A1 * | 9/2007 | Monassevitch | A61B 17/122 |
| | | | 606/151 |
| 2008/0004637 A1 | 1/2008 | Klassen et al. | |
| 2008/0300628 A1 | 12/2008 | Ellingwood | |
| 2009/0234358 A1 * | 9/2009 | Morales | A61L 31/10 |
| | | | 606/60 |
| 2010/0114133 A1 | 5/2010 | Huitema et al. | |
| 2011/0112559 A1 | 5/2011 | Monassevitch et al. | |
| 2011/0230900 A1 | 9/2011 | Sarradon | |
| 2011/0264118 A1 | 10/2011 | Mazzucco et al. | |
| 2013/0289586 A1 | 10/2013 | Mazzucco et al. | |
| 2016/0089144 A1 | 3/2016 | Mazzucco et al. | |

* cited by examiner

CLOSURE DEVICE

CROSS-REFERENCE TO RELATED APPLICATION

This application claims priority from similarly-titled U.S. Provisional Patent Application No. 63/314,419, filed Feb. 27, 2022, the entire contents of which are incorporated by reference herein.

BACKGROUND OF THE DISCLOSURE

The disclosure relates to closure devices, and, more particularly, to incision or wound closure devices.

Existing methods and devices for closing incisions, particularly for surgical procedures involving soft tissue and internal organs, generally do not adequately protect patients from the associated health risks and complications, such as iatrogenic damage, ruptured organs, infections, and tissue adhesion. Further, the current technology does not significantly decrease the time necessary to carry out many types of surgical procedures. Thus, the existing methods and devices do not reduce the various risks directly related to the duration of a surgical procedure.

Conventional devices for closing incisions include, for example, sutures, staples, tapes, adhesives and energy-based sealants. However, these closure mechanisms are not sufficient prevention mechanisms against post-operative surgical site infections (SSI). Conventional closure devices also suffer from other deficiencies, particularly for certain types of procedures, such as those involving soft tissue and internal organs. Sutures may be harmful because they can cause needlestick injury and subsequent infection to the medical personnel using them. Sutures also tend to encircle and enclose tissue, nerves, and blood vessels and can strangulate these structures, resulting in complications and tissue necrosis. Surgeons are also often faced with difficulty in repairing or closing incisions made for minimally-invasive surgeries, such as laparoscopic procedures. Significantly, conventional devices also often fail to achieve proper post-operative healing and may result in unsightly permanent scarring.

It would, therefore, be advantageous to manufacture a closure device, which enables medical personnel to more efficiently and accurately close an incision or wound.

BRIEF SUMMARY OF THE DISCLOSURE

Briefly stated, one aspect of the present disclosure is directed to a closure device including a first jaw and a second jaw. The first jaw has a first plate extending along an axial axis and at least one pair of first teeth projecting from the first plate. A first tooth of each of the at least one pair of first teeth projects proximate a first end of the first plate and a second tooth of each of the at least one pair of first teeth projects proximate an opposing second end of the first plate. Each pair of the at least one pair of first teeth is aligned along a respective axis parallel to the axial axis. The second jaw has a second plate extending generally parallel to the first plate and at least one pair of second teeth projecting from the second plate. A first tooth of each of the at least one pair of second teeth projects proximate a first end of the second plate and a second tooth of each of the at least one pair of second teeth projects proximate an opposing second end of the second plate. Each pair of the at least one pair of second teeth is aligned along a respective axis parallel to the axial axis. A thru-hole extends substantially perpendicularly, entirely through the second plate and a post is secured to and projects from the first plate along a longitudinal axis oriented substantially perpendicularly to the first and second plates. The thru-hole is configured to slidably receive the post therethrough in a rotationally fixed manner. The post extends through the thru-hole in a rotationally fixed manner, whereby the at least one pair of first teeth face the at least one pair of second teeth. Each pair of the at least one pair of first teeth extends toward the second plate and each pair of the at least one pair of second teeth extends toward the first plate. The first tooth of each of the at least one pair of first teeth is offset in a direction parallel to a transverse axis from the oppositely facing first tooth of each of the at least one pair of second teeth, and the second tooth of each of the at least one pair of first teeth is offset in a direction parallel to the transverse axis from the oppositely facing second tooth of each of the at least one pair of second teeth. The transverse axis is oriented perpendicularly to both the axial and longitudinal axes.

BRIEF DESCRIPTION OF THE SEVERAL VIEWS OF THE DRAWINGS

The following description of embodiments of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
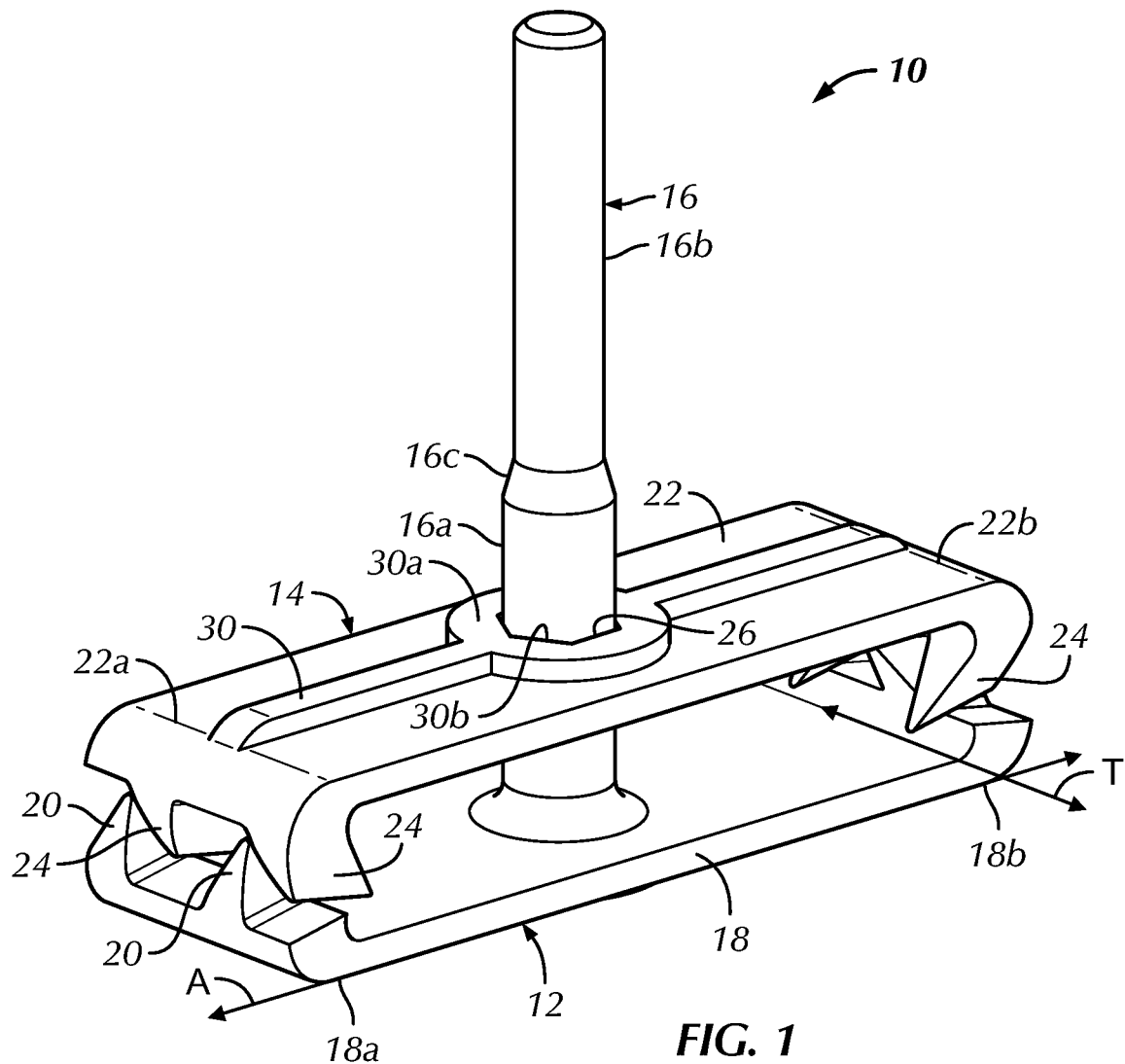
FIG. 1 is a top, perspective view of a closure device in accordance with a first embodiment of the present disclosure, in a contracted/use position.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the closure device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-9, a closure device, generally designated 10, in accordance with a first embodiment of the present disclosure. The closure device 10 may operate as an incision or wound closure device and may be utilized surgically.

Figure 6:
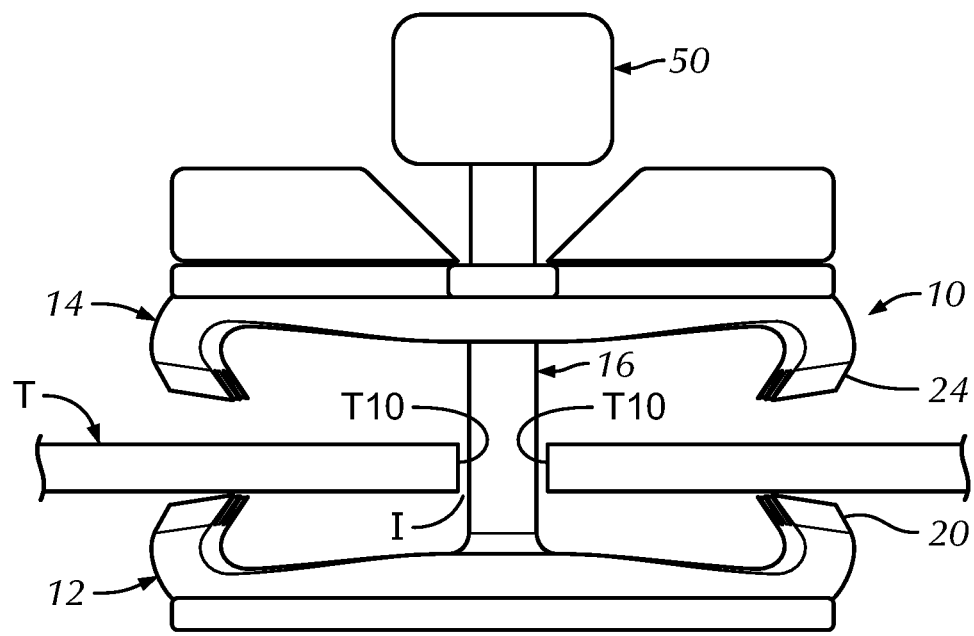
FIG. 6 is a schematic, side elevational view of the closure device of FIG. 1 in the starting position, placed within and about an incision with incised tissue interposed between the first and second jaws of the closure device.
Figure 7:
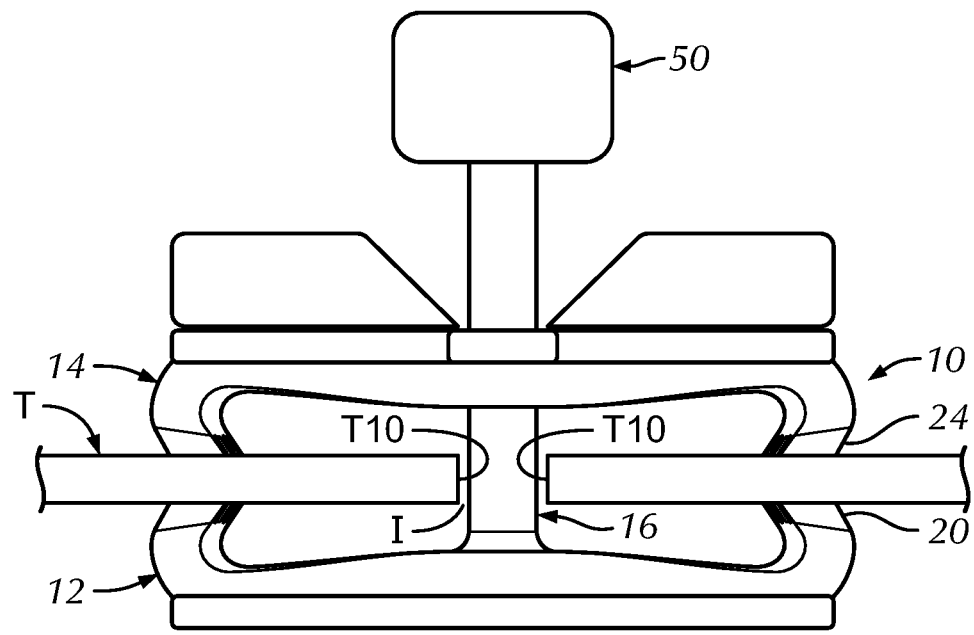
FIG. 7 is a schematic, side elevational view of the closure device of FIG. 1 placed within and about the incision and clamped onto the approximated incised tissue interposed between the first and second jaws of the closure device.
Figure 8:
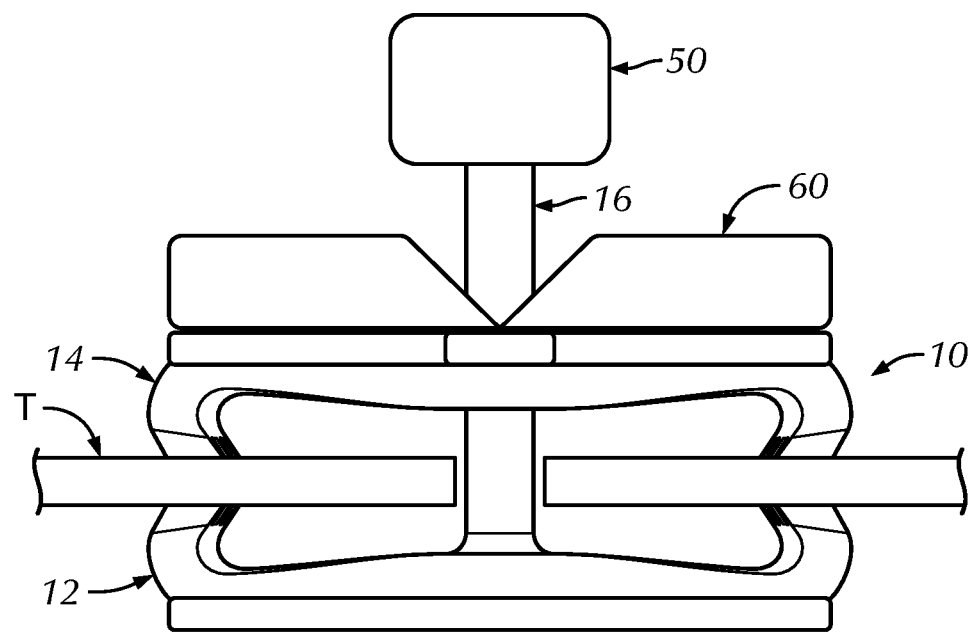
FIG. 8 is a schematic, side elevational view of the closure device of FIG. 7 in the contracted/use position wherein an excess portion of a post of the device is detached.

Referring to FIGS. 6-8, in the illustrated embodiment, the closure device 10 takes the form of a compressive, hemostatic clip which applies pressure to a patient's tissue T, e.g., by bringing together opposing edges T10 of an incision I, to close the incision I in an edge-to-edge manner and assist with hemostasis. The closure device 10 may be employed to close incisions or other surgical wounds in cutaneous tissue, subcutaneous tissue, including soft tissue, and internal organs, deep fascia, such as abdominal fascia, and the like. As one example, the closure device may be employed for closure of incisions made in internal tissue during an open surgical procedure in which relatively large sized skin incisions are made, e.g., for a midline laparotomy closure, in which large sized incisions of approximately 5 inches to approximately 20 inches are made. As should be understood by those of ordinary skill in the art, however, the closure device is appropriate for use in any type of surgical procedure performed on human patients or for veterinary or other surgical procedures. Accordingly, although the internal tissue of a human patient is generally referenced herein for illustrative purposes, it will be apparent to one of ordinary skill in the art that the closure device 10 may be employed on various types of tissue and on any internal organ, such as a kidney, lung, liver, heart, muscle, connective tissue, and the like, and on various types of animal patients.

In some procedures, several of the closure device 10 may be used to maintain incision approximation (e.g., placed at spaced locations along the length of an incision I) for proper closure and healing of incised tissue T. While the term "closure device" is used herein, it will be understood by those skilled in the art that the closure device 10 essentially functions as a clip or clamp, and thus may be referred to as such or any other appropriate name.

Referring now to FIGS. 1-4, the closure device 10 includes three primary components, a first jaw 12, a second jaw 14 and a post 16 positioned substantially perpendicularly to the first and second jaws 12, 14. In the orientation of FIG. 1, the first jaw 12 is a bottom jaw and the second jaw 14 is a top jaw, but the disclosure is not so limited. Each jaw 12, 14 may be constructed as a one-piece component, such as a one-piece molded component. In one configuration, the components of the closure device 10 may each be constructed of a biocompatible material, a bio-absorbable material, a combination thereof, or the like, such as, for example, as described in U.S. Pat. No. 9,358,008 ("the '008 patent"), titled "Surgical Device", the entire contents of which are incorporated by reference herein. In the illustrated embodiments, the first and second jaws 14 are substantially similarly dimensioned and shaped, but the disclosure is not so limited.

Figure 2:
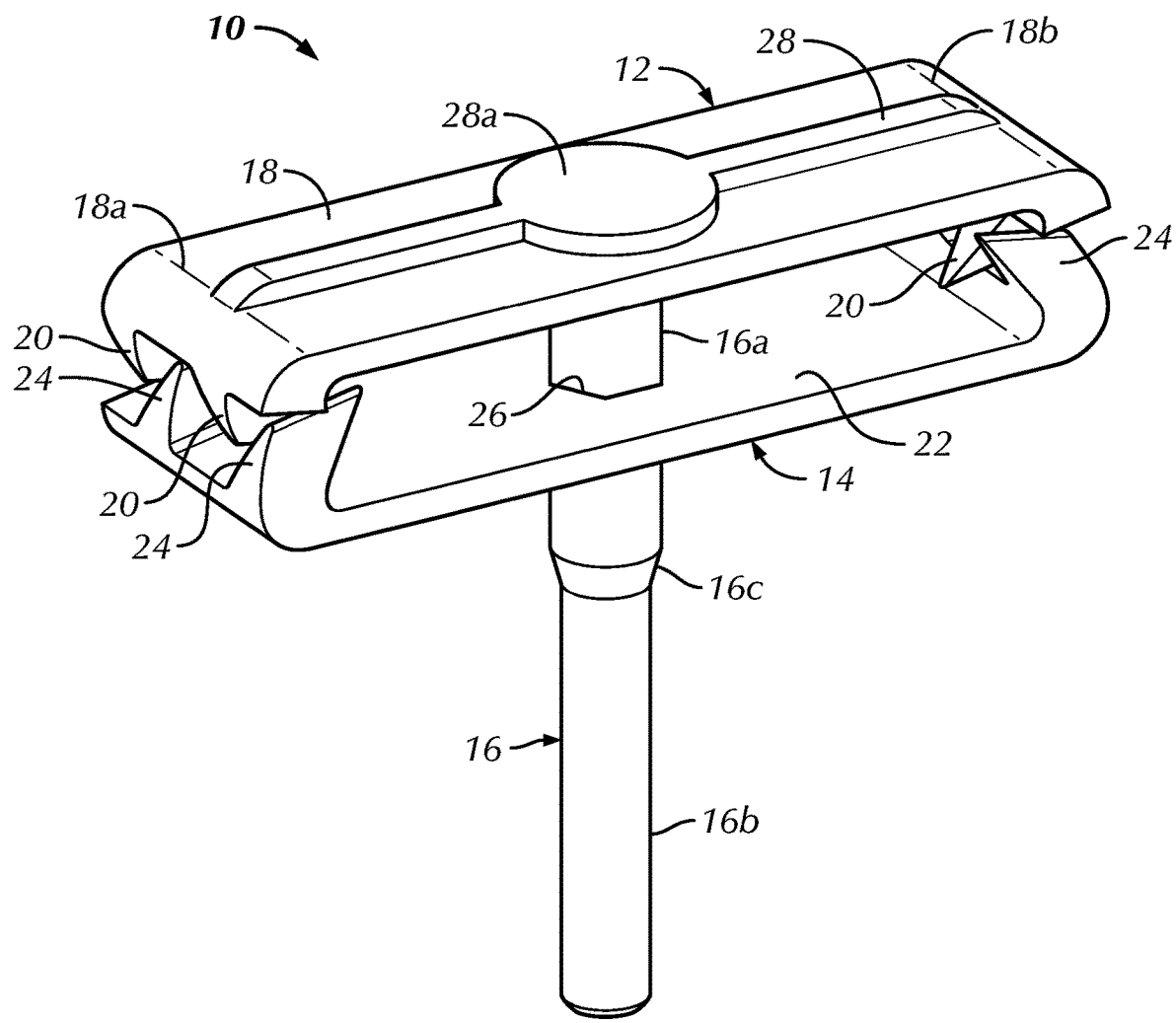
FIG. 2 is a bottom, perspective view of the closure device of FIG. 1 in the contracted/use position.
Figure 3:
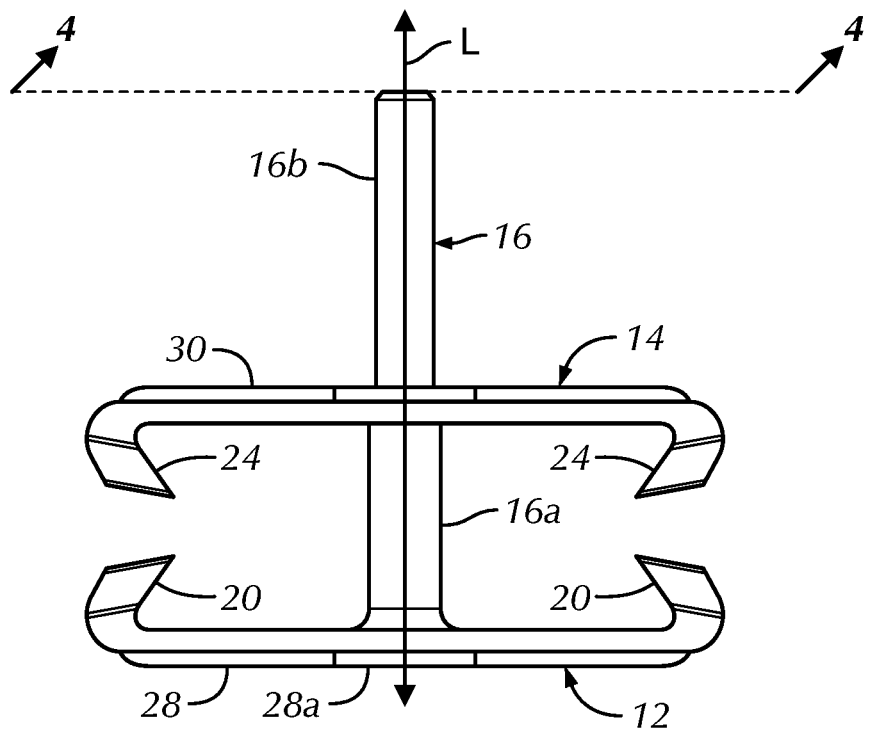
FIG. 3 is a side, elevational view of the closure device of FIG. 1, in a starting position.

As shown, the first jaw 12 includes a first plate 18 extending along an axial axis A (see FIG. 1). A transverse axis T (see FIG. 1) extends in a direction perpendicular to the axial axis A, from a front side of the closure device 10 to a rear side thereof. In the illustrated embodiment, the first plate 18 is substantially planar, but the disclosure is not so limited. The first jaw 12 further includes at least one pair of teeth 20 projecting from the first plate 18. In the illustrated embodiment, each pair of teeth 20 includes one tooth 20 projecting from, or proximate to, a first end 18a of the first plate 18 and an opposing tooth 20 projecting from, or proximate to, an opposing, second end 18b of the first plate 18. Each pair of teeth 20 is aligned along a respective axis parallel to the axial axis A. In FIGS. 1-2, the first jaw 12 includes two pairs of teeth 20, but the disclosure is not so limited. Rather, the first jaw 12 may include one pair of teeth 20, or three, four, five or more pairs of teeth 20, depending upon the particular type of incised tissue T to be clamped in order to optimize the structure of the closure device 10 for specific procedures. Where multiple pairs of teeth 20 are employed, the teeth 20 at, or proximate, the first end 18a are spaced apart in the direction of the transverse axis T and the teeth 20 at, or proximate, the second end 18b are also spaced apart in the direction of the transverse axis T, each pair of teeth 20 being aligned along a respective axis parallel to the axial axis A.

Similarly, the second jaw 14 includes a second plate 22 extending in the direction of the axial axis A (see FIG. 1), i.e., generally parallel to the first plate 18. In the illustrated embodiment, the second plate 22 is also substantially planar, but the disclosure is not so limited. The second jaw 14 also includes at least one pair of teeth 24 projecting from the second plate 22. In the illustrated embodiment, each pair of teeth 24 includes one tooth 24 projecting from, or proximate to, a first end 22a of the second plate 22 and an opposing tooth 24 projecting from, or proximate to, an opposing, second end 22b of the second plate 22. Each pair of teeth 24 is aligned along a respective axis parallel to the axial axis A. In the illustrated embodiment, the second jaw 14 includes two pairs of teeth 24, but the disclosure is not so limited. Rather, the second jaw 14 may also include one pair of teeth 22, or three, four, five or more pairs of teeth 22, depending upon the particular type of incised tissue T to be clamped in order to optimize the structure of the closure device 10 for specific procedures. In one configuration, the second jaw 14 may include the same number of pairs of teeth 24 as the first jaw 12 includes pairs of teeth 20. Alternatively, the second jaw 14 may include a different number of pairs of teeth 24 than the first jaw 12 has in pairs of teeth 20. Where multiple pairs of teeth 24 are employed, the teeth 24 at, or proximate to, the first end 22a are spaced apart in the direction of the transverse axis T and the teeth 24 at, or proximate to, the second end 22b are also spaced apart in the direction of the transverse axis T, each pair of teeth 24 being aligned along a respective axis parallel to the axial axis A.

The first and second jaws 12, 14 are aligned (in registry) with one another relative to the axes A and T and operatively engaged with one another via the post 16. When the first and second jaws 12, 14 are properly engaged with the post 16 (as will be described in further detail below), the teeth 20 of the first jaw 12 face the teeth 24 of the second jaw 14. The teeth 20 of the first jaw 12 projecting from, or proximate to, the first end 18*a* are offset in a direction parallel to the transverse axis T from the oppositely facing teeth 24 of the second jaw 14 projecting from, or proximate to, the first end 22*a*. Similarly, the teeth 20 of the first jaw 12 projecting from, or proximate to, the second end 18*b* are offset in a direction parallel to the transverse axis T from the oppositely facing teeth 24 of the second jaw 14 projecting from, or proximate to, the second end 22*b*. Offsetting the teeth 20 from the oppositely facing teeth 24 along a direction parallel to the transverse axis T enables closer engagement of the first and second jaws 12, 14 for increased clamping force on the interposed tissue T. Offsetting the teeth 20 from the oppositely facing teeth 24 along a direction parallel to the transverse axis T also enables the teeth 20, 24 to engage each other in an interlocking alternating manner in order to reduce movement/slippage of the opposing sides of the incision I of the interposed tissue T. The teeth 20, 24 may be formed, shaped, sized, angled, spaced apart, and/or a combination thereof as described in the '008 patent.

The post 16 is generally centrally located with respect to the first plate 18 and projects substantially perpendicularly therefrom. In the illustrated embodiment(s), the post 16 is also generally cylindrical in shape, but the disclosure is not so limited. That is, alternative cross-sectional shapes of the post 16 may be employed. In the present embodiment, the post 16 is formed as a one-piece, i.e., monolithic, component with the first jaw 12, such as a one-piece molded component, but the disclosure is not so limited (as will be described further below). The second jaw 14 includes a longitudinally extending thru-hole 26 extending completely through the second plate 22 and configured to slidably receive the post 16 therethrough. The thru-hole 26 is also generally centrally located with respect to the second plate 22. The post 16 and the thru-hole 26 are configured, i.e., correspondingly dimensioned, to slidably engage one another in an interference-style, press fit. In one configuration, as shown best in FIGS. 1 and 2, the thru-hole 26 is hexagonally shaped in the cross-sectional plane defined by axes A and T.

Advantageously, employing an interference fit between the post 16 and the thru-hole 26 increases the compressive force applicable by the closure device 10 onto the incised tissue T and also limits the closure device 10 to a single use because the interference-style engagement is a substantially permanent engagement. That is, upon initial advancement of the post 16 through the thru-hole 26 (or the thru-hole 26 onto the post 16), the second jaw 14 is substantially fixed in place relative to the first jaw 12 and the post 16 cannot subsequently be withdrawn from the thru-hole 26 without causing damage to the thru-hole 26 and/or the post 16, and/or otherwise to the first jaw 12 and/or the second jaw 14. The closure device 10 is intended for single use closure, particularly for incision closure usage.

Further advantageously, employing an interference fit where the thru-hole 26 defines a different cross-sectional shape than the circular cross-sectional shape of the post 16 facilitates engagement of the post 16 with the thru-hole 26 in a rotationally-fixed manner. Employing a hexagonally shaped thru-hole 26 in cross-section provides six individual contact surfaces engaging the periphery of the post 16 that contribute to interference against rotation of the post 16 with respect to the thru-hole 26, and, in turn, rotationally fixing the first jaw 12 with the second jaw 14. As should be understood by those of ordinary skill in the art, however, the post 16 and the thru-hole 26 may each take any of numerous different shapes, e.g., having three or more sides. Such shapes may be configured to prevent rotation therebetween and between the first and second jaws 12, 14. For example, the thru-hole 26 may be square shaped, optionally with a square shaped post 16, or may take the form of a flattened/elongate cylinder, i.e., having opposing central flat/linear sides connected at either end by rounded/arcuate ends. Additionally, or alternatively, the post 16 and thru-hole 26 may take the form of complementary key and keyhole components to prevent rotation therebetween. Yet further, the closure device 10 may additionally or alternatively employ two or more posts 16 and a corresponding two or more thru-holes 26, to prevent rotation between first and second jaws 12, 14. In such a configuration, cylindrical thru-holes 26 and corresponding cylindrical posts 16 may be employed.

Advantageously, forming the post 16 and the first jaw 12 as a one-piece component rotationally fixes the post 16 with the first jaw 12, which further assists in maintaining rotational alignment and fixation of the first and second jaws 12, 14 with respect to one another. Further advantageously, the one-piece configuration of the post 16 and the first jaw 12 results in a two-component closure device 10, i.e., the first jaw 12 and the post 16 as one component and the second jaw 14 as a second component, which, in turn, facilitates advancement/pressing of the second jaw 14 toward the first jaw 12. That is, the post 16 may be grasped and pulled through the second jaw 14, to pull the first jaw 12 toward the second jaw 14, with the sufficient force necessary to adequately engage the incised tissue T therebetween when closing an incision I. Alternatively, the second jaw 14 may be advanced along the post 16 toward the first jaw 12, with the force necessary to adequately engage the incised tissue T therebetween when closing an incision I.

Optionally, the post 16 may feature a varying diameter, or otherwise the cross-sectional dimension in the plane defined by the axes A and T, along the longitudinal axis L. In FIGS. 1-5, for example, the post 16 includes a greater diameter, first portion 16*a* projecting from the first jaw 12 which transitions to a smaller/narrower diameter, second portion 16*b*. As shown in FIGS. 1-4, the post 16 may employ a beveled transition section 16*c*, but the disclosure is not so limited. Alternatively, for example, and as shown in FIG. 5, the post 16 may employ a step-wise transition section 16*c'*. As another alternative, the post 16 may take the form of a tapered down post 16 (not shown) from the first jaw 12 toward the free terminal end thereof.

Featuring a varying cross-sectional size enables the external peripheral dimension of the terminal, second portion 16*b* of the post 16 to be smaller than the internal peripheral dimension of the thru-hole 26, whereas the external peripheral dimension of first portion 16*a* slightly exceeds the internal peripheral dimension of the thru-hole 26, to form the interference fit (as should be understood by those of ordinary skill in the art). Advantageously, such a configuration enables advancement of the second jaw 14 along the second portion 16*b* of the post 16, toward the first jaw 12, without wear on the internal surfaces of the thru-hole 26. Rather, the interference-style engagement is initiated upon the second jaw 14 reaching the first portion 16*a* of the post 16. Accordingly, and advantageously, a shorter stroke is required to advance the second clamp 14 from the beginning of the first portion 16*a* toward the first jaw 12 to fully clamp the interposed tissue T between the jaws 12, 14.

Figure 4:
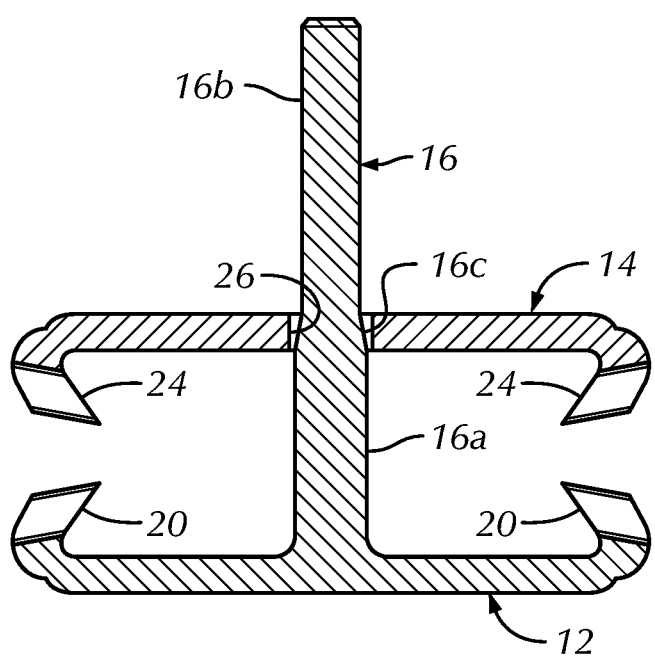
FIG. 4 is a cross-sectional, elevational view of the closure device of FIG. 1, taken along sectional line 4-4 of FIG. 3.
Figure 5:
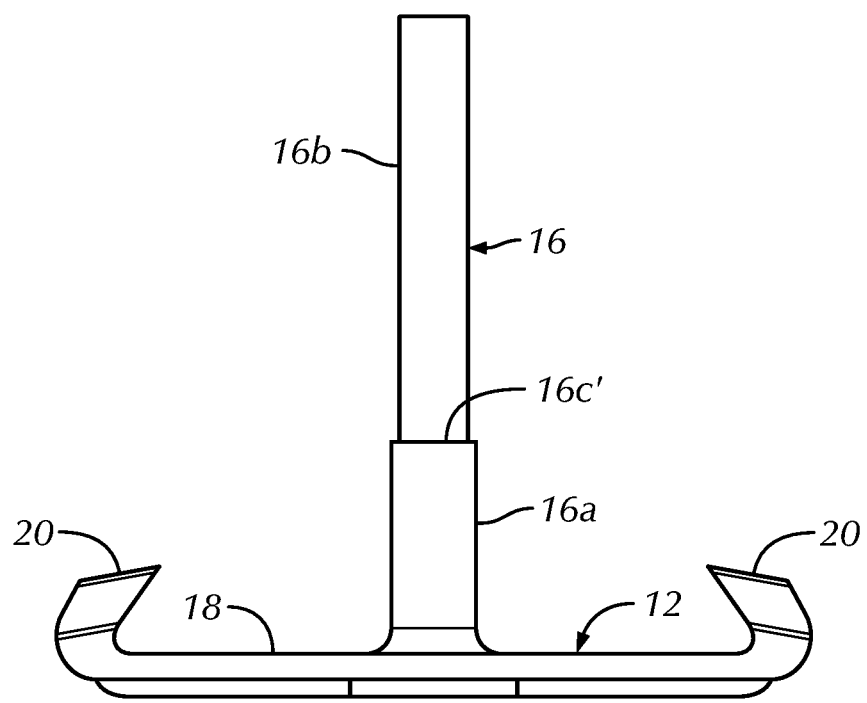
FIG. 5 is a side, elevational view of an alternative configuration of a first jaw of the closure device of FIG. 1.

As shown best in FIG. 4, the closure device 10 may be initially provided in a first or open position, with the inner peripheral surface of the thru-hole 26 closest to the first jaw 12 in the longitudinal direction L engaging the rim of the first portion 16a adjoining the transition section 16c. Thus, the beveled, transition section 16c is positioned within the thru-hole 26. The transition section 16c may define a longitudinal extent in the direction L similar to the longitudinal extent of the thru-hole 26, whereby the remainder of the longitudinal extent of the thru-hole 26 beyond the inner peripheral surface of the thru-hole 26 closest to the first jaw 12 is not in contact with the post 16. Advantageously, therefore, the second jaw 14 may be stabilized in a stationary manner with respect to the first jaw 12 for transport and pre-use, without yet fully establishing the single-use interference-style connection. In the first position, the teeth 20, 24 are not interlocked with one another.

Referring to FIGS. 1 and 2, one or both of the first and second jaws 12, 14 may optionally include a structural support member or rib for increased structural integrity of the respective jaws 12, 14. In the illustrated embodiment, the first jaw 12 includes a first support member 28 (see FIG. 2) extending along the first plate 18. In the illustrated configuration, the first support member 28 extends from the first end 18a to the second end 18b, in a substantially planar manner, but the disclosure is not so limited. The first support member 28 may include a substantially central, widened portion 28a to provide additional structural support underlying the post 16. In the illustrated embodiment, the second jaw 14 includes a second support member or rib 30 (see FIG. 1) extending along the second plate 22. In the illustrated configuration, the second support member 30 extends from the first end 22a to the second end 22b, in a substantially planar manner, but the disclosure is not so limited. The second support member 30 includes a substantially central, widened portion 30a having a central orifice 30b in registry with the thru-hole 26. The orifice 30b is complementarily sized and shaped as the thru-hole 26, to, in effect, extend the longitudinal extent of the thru-hole 26. As shown, the first and second structural members 28, 30 take the form of a beam that is predominately, substantially narrower than the first and second jaws 12, 14, respectively, in the direction parallel to the axis T, e.g., such as an I-beam design, but the disclosure is not so limited. In the illustrated embodiment, for example, the first and second structural members 28, 30 are between approximately 10% and approximately 50% of the width of the first and second jaws 12, 14, respectively, in the direction parallel to the axis T. Advantageously, employing the structural members 28, 30 assists in preventing flexing of the first and second jaws 12, 14 under the forces applied thereon. Additionally, the structural members 28, 30 enable reduction of the size of the respective first and second plates 18, 22 without sacrificing the structural integrity of the first and second jaws 12, 14. Yet further, inclusion of the orifice 30b effectively increases the longitudinal extent of the contact surfaces engaging the post 16 in an interference-style engagement without increasing the longitudinal extent, i.e., thickness, of the entire second jaw 14. Accordingly, upon advancing the first and second jaws 12, 14 toward one another to effect a clamping force onto the interposed, incised tissue, the increased interference results in more secure fastening of the first and second jaws 12, 14 relative to one another, and, in turn, a more secure clamping force.

In operation, during a surgical procedure, the closure device 10 is inserted about and within an incision I (requiring approximation) with a patient's tissue T between opposing edges T10 of the incision I. For example, in an open surgical procedure, a surgeon first makes one or more incisions I in the patient's subcutaneous tissue T and then uses various surgical instruments to perform the procedure. Once the procedure is completed, the surgeon positions and clamps the closure device 10 (or a plurality of closure devices 10) on the incised tissue 100.

More specifically, the one-piece configuration of the post 16 and the first jaw 12 with the second jaw 14 mounted on the post 16 advantageously enables a surgeon to manipulate the closure device 10 into the appropriate location and orientation about and within an incision I, via the post 16. Optionally, the surgeon may initially position a cannula (not shown) within the incised tissue T, and the closure device 10 may be advanced through the cannula. Subsequently, the surgeon may utilize a tool, or the post 16 (as previously described), to properly position the closure device 10 about and within the incision I.

The closure device 10 is initially in the first or starting (open) position thereof (see e.g., FIGS. 3, 4), with the first and second jaws 12, 14 sufficiently spaced apart from one another along the longitudinal axis/direction L to enable interposing of the incised tissue T therebetween. As shown in FIG. 6, the closure device 10 is placed between the opposing edges T10 of the incision I with the first jaw 10 underlying the incised tissue T and the second jaw 14 overlying the incised tissue T (or vice versa). The closure device 10 is oriented such that the teeth 20, 24 at, or proximate, the respective first sides 18a, 22a, are positioned on one side of the incision I and the teeth 20, 24 at, or proximate, the respective second sides 18a, 22a, are positioned on the opposing side of the incision I. The incision I extends substantially parallel to the transverse axis T therebetween.

Upon approximating the opposing edges T10 of the incision I, e.g., by another party, the surgeon may apply a longitudinally oriented force, e.g., via a tool 50, to advance at least one of the first and second jaws 12, 14 toward the other (in the longitudinal direction L) along the post 16 into a second, contracted/use (closed) position (see e.g., FIGS. 1, 2, and 7), wherein the teeth 20, 24 engage the interposed tissue T in an interlocking manner and maintain the approximation of the opposing edges T10 of the incision I in a substantially edge-to-edge manner. In one example, the tool 50 may be utilized to generally immobilize the second jaw 14 and pull the post 16 relative thereto through the thru-hole 26 with sufficient force to effect satisfactory clamping of the first and second jaws 12, 14 upon the interposed tissue T, e.g., by sufficiently interlocking the opposing teeth 20, 24. Alternatively, the tool 50 may be utilized to immobilize the first jaw 12 by stabilizing the post 16 and advance the second jaw 14 along the post 16 toward the first jaw 12 with sufficient force to effect satisfactory clamping of the first and second jaws 12, 14 upon the interposed tissue T.

Figure 9:
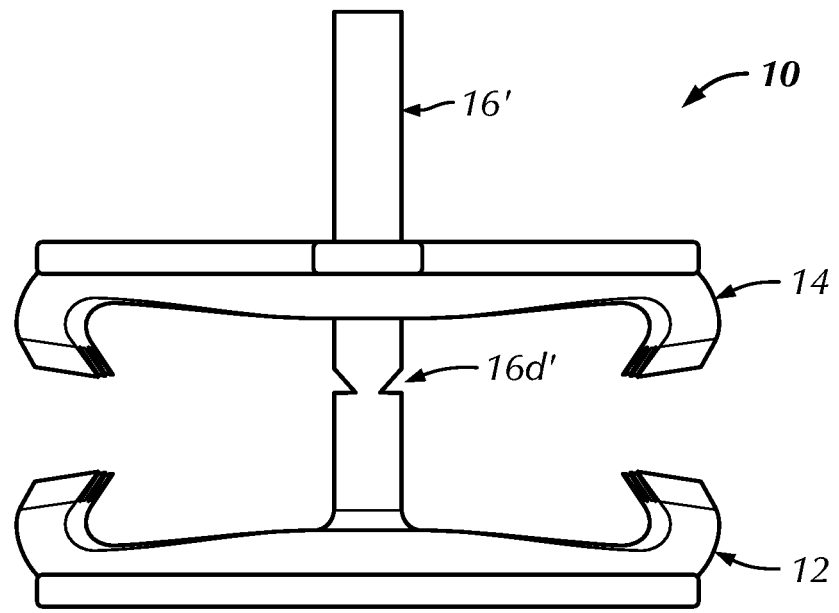
FIG. 9 is a side, elevational view of the closure device of FIG. 1, having an alternative configuration of the post.

Optionally, as shown in FIG. 8, the portion of the post 16 extending beyond the second jaw 14, e.g., an excess portion, may be detached, e.g., via a cutting tool 60. Additionally, or alternatively, as shown in FIG. 9, the post 16' may take the form of a frangible post 16' having a necked down portion 16d'. In such a configuration, the second jaw 14 is advanced past the necked down portion 16d', i.e., positioned closer to the first jaw 12 relative to the necked down portion 16d', in the contracted position of the closure device 10. Thereafter, the terminal portion of the post 16' beyond the necked down portion 16d' may be detached via application of sufficient force, e.g., tension, thereon to break the necked down portion 16d'. The positioning of the necked down portion 16d' along the post 16' may be determined according to the intended fascia application. As should be understood by those of ordinary skill in the art, fascia thickness is well-defined.

Figure 10:
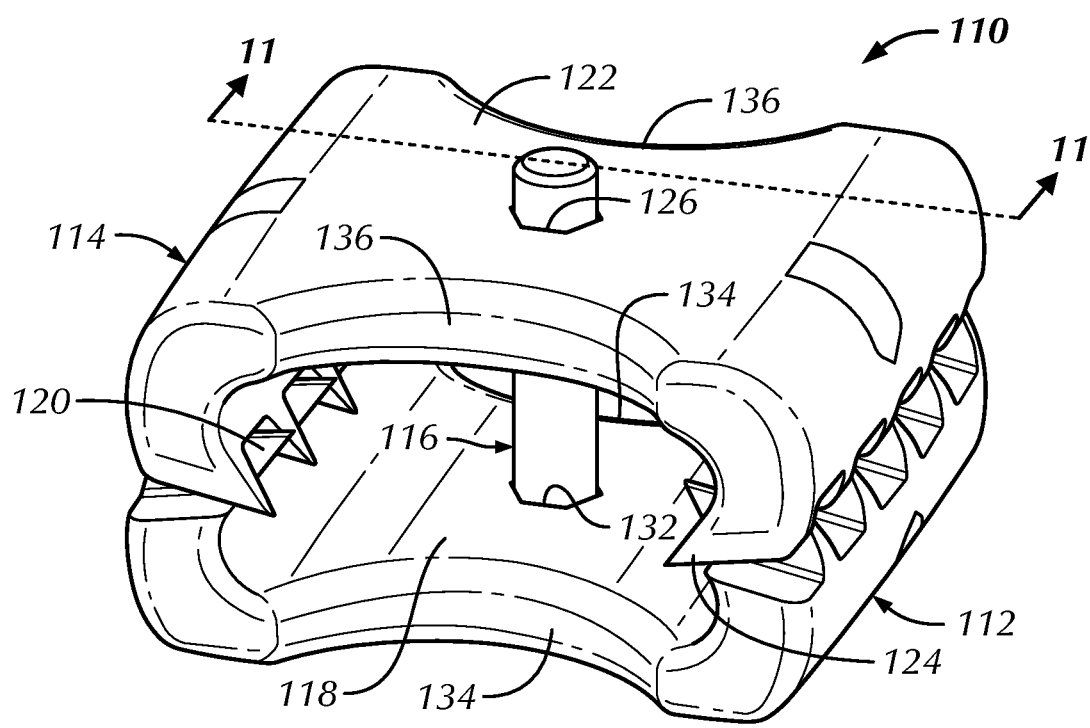
FIG. 10 is a top, perspective view of a closure device in accordance with a second embodiment of the present disclosure, in a contracted/use position.
Figure 11:
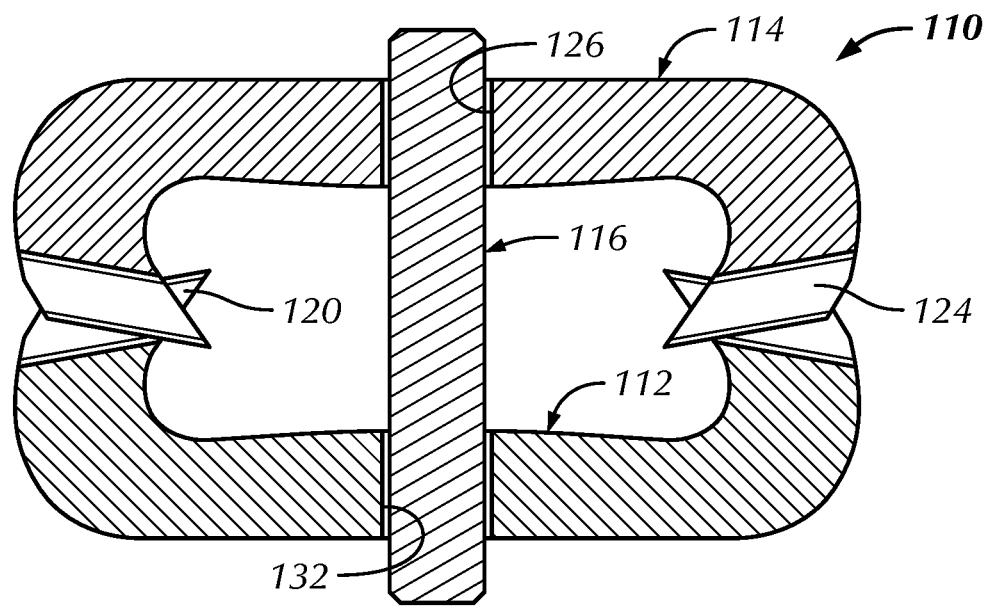
FIG. 11 is a cross-sectional, elevational view of the closure device of FIG. 10, taken along sectional line 11-11 of FIG. 10.

FIGS. 10-11 illustrate a second embodiment of a closure device 110. The reference numerals of the second embodiment are distinguishable from those of the above-described first embodiment by a factor of one hundred (100), but otherwise indicate the same elements as indicated above, except as otherwise specified. The closure device 110 of the present embodiment is similar to that of the earlier embodiment. Therefore, the description of certain similarities and modes of operation between the embodiments may be omitted herein for the sake of brevity and convenience, and, therefore, is not limiting.

A primary difference of the closure device 110 of the second embodiment over the closure device 10 of the first embodiment is that, although the closure device 110 may be provided for use in a pre-assembled, starting configuration thereof (with the first and second jaws 112, 114 sufficiently spaced apart from one another along the longitudinal axis/direction to enable interposing of incised tissue T therebetween), the closure device 110 of the second embodiment is constructed of three distinct pieces. That is, the post 116 is a separate component from the first jaw 112. In FIGS. 10 and 11, the first jaw 112 includes a first thru-hole 132 extending completely through the first plate 118 and aligned with the second thru-hole 126 of the second jaw 114. As should be understood, however, one of the thru-holes 126, 132 may optionally take the form of a socket in the respective jaw 112, 114, rather than an open-ended thru-hole extended fully through the respective plate 118, 122.

In the illustrated embodiment, the first thru-hole 132 is hexagonally shaped as the second thru-hole 26, 126, and is configured to receive the post 116 in an interference-style fit but is not limited to the hexagonal shape (as previously described with respect to the thru-hole 26). As should be understood, because the post 116 is slidably engaged with both the first and second jaws 112, 114, both the first and second jaws 112, 114 are pressed toward one another into the contracted position of the closure device 110. In turn, and as shown best in FIG. 11, the post 116 may project beyond one or both of the first and second jaws 112, 114 in the contracted position. Optionally, as described with respect to the closure device 10, the excess terminal portions of the post 116 projecting beyond one or both of the first and second jaws 112, 114 may be detached.

In FIGS. 10 and 11, the closure device 110 includes five pairs of a first set of teeth 120 and five pairs of a second set of teeth 124, but the disclosure is not so limited. In view of the number of teeth 120, 124, the closure device 110 is thicker along the axis T relative to the closure device 10, having two pairs of teeth 20 and two pairs of teeth 24. Accordingly, the closure device 110 does not employ the structural members 28, 30, but may alternatively include such structural members. Optionally, the first and second plates 118, 222 include respective pairs of oppositely disposed indents 134, 136, positioned on the front and rear sides of the first and second jaws 112, 114, between the respective pairs of teeth 120, 124. In the illustrated embodiments, the indents 134, 136 take the form of arcuate indents, but the disclosure is not so limited. As also should be understood, only one indent 134, 136 may be formed in each jaw 112, 114, and/or, only one jaw 112, 114 may include the respective indent(s) 134, 136. Advantageously, the indent(s) 134, 136 reduce the footprint and material of the jaw(s) 112, 114, while maintaining appropriate structural integrity thereof for effecting sufficient clamping force.

It will be appreciated by those skilled in the art that various modifications and alterations could be made to the disclosure above without departing from the broad inventive concept(s) thereof. It is understood, therefore, that this disclosure is not limited to the particular embodiment(s) disclosed, but it is intended to cover modifications within the spirit and scope of the present disclosure as defined by the present description, as set forth in the appended claims.

I claim:

1. A closure device comprising:
   a first jaw having:
      a first plate extending along an axial axis, and
      at least one pair of first teeth projecting from the first plate, a first tooth of each of the at least one pair of first teeth projecting proximate a first end of the first plate and a second tooth of each of the at least one pair of first teeth projecting proximate an opposing second end of the first plate, each pair of the at least one pair of first teeth being aligned along a respective axis parallel to the axial axis;
   a second jaw having:
      a second plate extending generally parallel to the first plate,
      at least one pair of second teeth projecting from the second plate, a first tooth of each of the at least one pair of second teeth projecting proximate a first end of the second plate and a second tooth of each of the at least one pair of second teeth projecting proximate an opposing second end of the second plate, each pair of the at least one pair of second teeth being aligned along a respective axis parallel to the axial axis, and
      a thru-hole extending substantially perpendicularly, entirely through the second plate; and
   a post secured to and projecting from the first plate along a longitudinal axis oriented substantially perpendicularly to the first and second plates, the thru-hole being configured to slidably receive the post therethrough in a rotationally fixed manner,
   wherein, the post extends through the thru-hole in a rotationally fixed manner, whereby the at least one pair of first teeth face the at least one pair of second teeth and
   wherein each pair of the at least one pair of first teeth extends toward the second plate and each pair of the at least one pair of second teeth extends toward the first plate, the first tooth of each of the at least one pair of first teeth being offset in a direction parallel to a transverse axis from the oppositely facing first tooth of each of the at least one pair of second teeth, and the second tooth of each of the at least one pair of first teeth being offset in a direction parallel to the transverse axis from the oppositely facing second tooth of each of the at least one pair of second teeth, the transverse axis being oriented perpendicularly to both the axial and longitudinal axes.

2. The closure device of claim 1, wherein the post includes a first portion projecting from the first jaw which transitions to a narrower, second portion, wherein a cross-sectional dimension of the second portion in a plane perpendicular to the longitudinal axis is smaller than the thru-hole and a cross-sectional dimension of the first portion in the plane perpendicular to the longitudinal axis is sized to form an interference fit with the thru-hole.

3. The closure device of claim 2, wherein the post defines a beveled transition section between the first and second portions thereof.

4. The closure device of claim 1, wherein the post defines a tapered portion along the longitudinal axis, wherein a cross-sectional dimension of a distal end of the tapered portion, in a plane perpendicular to the longitudinal axis, is smaller than the thru-hole, and a cross-sectional dimension of a proximal end of the tapered portion, in the plane perpendicular to the longitudinal axis, is sized to form an interference fit with the thru-hole.

5. The closure device of claim 1, wherein a cross-sectional shape of the post and a cross-sectional shape of the thru-hole, in a plane perpendicular to the longitudinal axis, are correspondingly configured to form the rotationally fixed engagement between the post and the thru-hole.

6. The closure device of claim 1, wherein each of the first and second jaws is constructed of a one-piece molded component.

7. The closure device of claim 1, wherein the at least one pair of first teeth is equal to the at least one pair of second teeth.

8. The closure device of claim 1, wherein the post is monolithic with the first jaw.

9. The closure device of claim 1, wherein the post is generally centrally located relative to the first plate and the thru-hole is generally centrally located relative to the second plate.

10. The closure device of claim 1, wherein the post and the thru-hole are correspondingly dimensioned to slidably engage one another in an interference-style, press fit.

11. The closure device of claim 1, wherein the thru-hole is hexagonally shaped in cross-section in a plane perpendicular to the longitudinal axis.

12. The closure device of claim 11, wherein the post is generally cylindrical.

13. The closure device of claim 1, wherein at least one of the first or second jaws includes a rib axially extending upon the corresponding first or second plate thereof for increased structural integrity thereof.

14. The closure device of claim 1, wherein the at least one pair of first teeth comprises a plurality of pairs of first teeth and the at least one pair of second teeth comprises a plurality of pairs of second teeth, wherein the first teeth of the plurality of pairs of first teeth are spaced apart along the transverse axis, the first teeth of the plurality of pairs of second teeth are spaced apart along the transverse axis, the second teeth of the plurality of pairs of first teeth are spaced apart along the transverse axis and the second teeth of the plurality of pairs of second teeth are spaced apart along the transverse axis.

15. A method of closing an incision, the method comprising the steps of:

inserting the closure device of claim 1 within the incision and interposing incised tissue between the first and second jaws, whereby the first tooth of each of the at least one pair of first teeth and the first tooth of each of the at least one pair of second teeth are positioned on one side of the incision and the second tooth of each of the at least one pair of first teeth and the second tooth of each of the at least one pair of second teeth are positioned on an opposing side of the incision; and advancing at least one of the first and second jaws toward the other such that the first tooth of each of the at least one pair of first teeth and the first tooth of each of the at least one pair of second teeth engage the interposed incised tissue in an interlocking manner and the second tooth of each of the at least one pair of first teeth and the second tooth of each of the at least one pair of second teeth engage the interposed incised tissue in an interlocking manner, thereby clamping the interposed incised tissue between first and second jaws.

16. The method of claim 15, wherein the advancing steps comprises:

stabilizing the second jaw and pulling the post through the thru-hole.

17. The method of claim 15, wherein the advancing step comprises:

stabilizing the first jaw and advancing the second jaw along the post toward the first jaw.

18. The method of claim 15, wherein the post includes a first portion projecting from the first jaw which transitions to a narrower, second portion, wherein a cross-sectional dimension of the second portion in a plane perpendicular to the longitudinal axis is smaller than the thru-hole and a cross-sectional dimension of the first portion in the plane perpendicular to the longitudinal axis is sized to form an interference fit with the thru-hole, and wherein in the inserting step, the closure device is assembled in a first position wherein an inner peripheral surface of the thru-hole closest to the first jaw engages an end of the first portion, and the advancing step comprises advancing the second portion of the post through the thru-hole to establish the interference fit therebetween.

19. The method of claim 18, wherein the post defines a beveled transition section between the first and second portions thereof, the beveled transition section being positioned within the thru-hole in the first position of the closure device.

20. The method of claim 15, further comprising the step of:

detaching an excess portion of the post extending beyond the second jaw after the advancing step.

* * * * *